June 10, 1958 — S. B. WELCH — 2,838,645
SURFACE HEATING UNIT CONTROL SYSTEM
Filed Nov. 14, 1956

INVENTOR.
STANLEY B. WELCH
BY
HIS ATTORNEY

United States Patent Office 2,838,645
Patented June 10, 1958

2,838,645

SURFACE HEATING UNIT CONTROL SYSTEM

Stanley B. Welch, Louisville, Ky., assignor to General Electric Company, a corporation of New York Application November 14, 1956, Serial No. 622,171

5 Claims. (Cl. 219—20)

This invention relates to thermostatically controlled heating systems, and more particularly to a control system for electric range surface heating units which includes an element responsive to the temperature of a utensil resting on the heating unit.

Various cooking unit control systems incorporating a pan temperature sensing device have been developed in the past, and some are in commercial use at the present time. Typically, such systems include a temperature sensing device such as a bimetallic element, or a fluid filled bulb mounted so as to be in contact with the utensil, and a switching device in a circuit with the heating unit and controlled by the sensing device.

A principal object of the present invention is to provide a control system of this type so arranged that the rate of heat input to the cooking utensil, as well as the desired temperature, may be preselected.

Another object of this invention is to provide a cooking unit control system so arranged that a relatively high rate of heat input is provided until the utensil approaches a pre-selected temperature range, and thereafter heat is supplied at a reduced pre-selected rate so long as the temperature of the utensil remains in the pre-selected range.

Further objects and advantages of this invention will become apparent as the following description proceeds, and the features of novelty which characterize the invention will be pointed out with particularity in the claims annexed to and forming a part of this specification.

Briefly stated, in accordance with one aspect of my invention I provide a set of thermostatically controlled contacts actuated by a temperature responsive bulb and bellows system so as to control energization of a cycling current control device in circuit with the heating element of a surface cooking unit. The electrical circuit elements are so arranged that at the beginning of a heating operation the current control device remains in a continuous current position until the utensil temperature enters a pre-selected range at which time periodic interruption of the heating element current begins. Also, the circuit is so arranged that the heating element circuit is opened whenever the utensil temperature exceeds the upper limit of the preselected temperature range. Both the temperature setting of the thermostatic mechanism and the on-off ratio of the cycling current control device are manually adjustable (preferably by means of a common control knob) and hence both the cooking temperature and the appropriate wattage input rate may be selected before the cooking operation begins.

For a better understanding of my invention reference may be made to the following description and the accompanying drawing in which.

Figure 1:
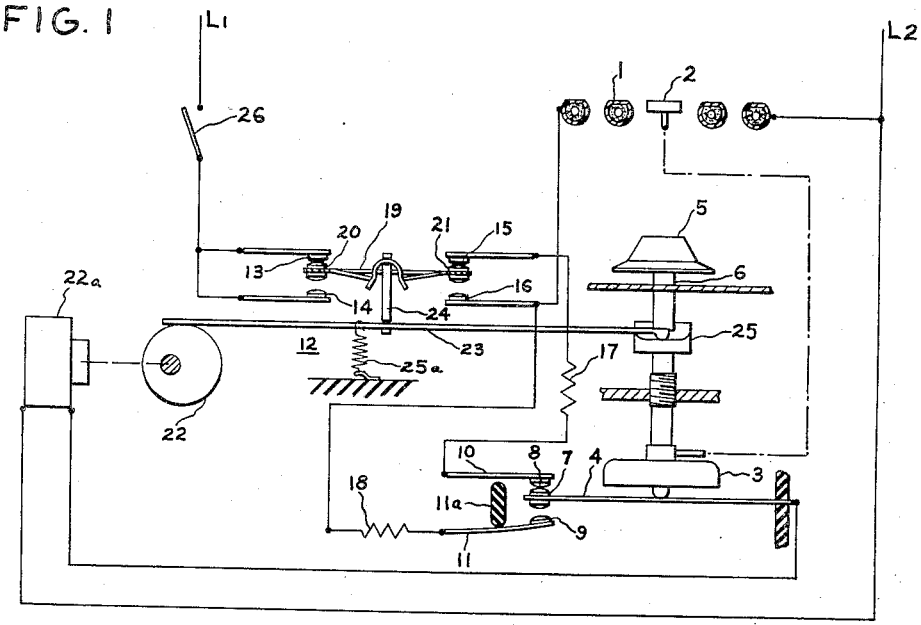
Fig. 1 is a diagrammatic view of one embodiment of my invention.

Referring to the drawing and in particular Fig. 1 thereof, the numeral 1 designates an electric surface heating unit of the type commonly mounted on the cooking top of an electric range. Heating element 1 is supplied with power through power supply lines L1 and L2, the supply of power to heating element 1 being regulated by the control system now to be described.

A temperature sensing bulb 2 centrally supported within heating element 1 is hydraulically connected to bellows 3 which is arranged to actuate a movable contact arm 4 in accordance with the temperature of a utensil resting on heating unit 1 and in thermal contact with bulb 2. The thermostatic mechanism comprising bulb 2, bellows 3, and movable contact arm 4 is manually adjustable by means of a control knob 5 secured to a rotatable shaft 6 arranged to effect longitudinal movement of bellows 3 so as to vary the initial position of arm 4. Movable contact arm 4 carries on its free end an electric contact 7 which cooperates with a pair of spaced resiliently mounted contacts 8 and 9 located on opposite sides of movable contact 7. Resilient contact arms 10 and 11 are provided for the purpose of carrying contacts 8 and 9, and arms 10 and 11 are biased toward each other and positioned so that contacts 8 and 9 are simultaneously in engagement with movable contact 7 whenever it is in a range of positions corresponding to the temperature range preselected by adjustment of control knob 5. Preferably movement of arms 10 and 11 toward each other is limited by a stop member 11a.

Contacts 7, 8 and 9 of the thermostatic mechanism described above are arranged to control the energization of an infinite heat control switch mechanism 12 which in turn controls the supply of power to heating unit 1. Infinite heat control mechanism 12 includes a pair of spaced fixed contacts 13 and 14 connected in circuit with supply line L1, a pair of spaced fixed contacts 15 and 16 connected in series with a resistor 17 and contact 8, and a resistor 18 and contact 9 respectively, and a snap acting bridging contact member 19 which carries a pair of intermediate contacts 20 and 21. Movable contact member 19 is periodically actuated between the position shown in Fig. 1 in which contact 20 engages contact 13 and contact 21 engages contact 15 to a second position in which contact 20 engages contact 14 and contact 21 engages contact 16. As illustrated in Fig. 1, one suitable means for actuating movable contact 19 includes a rotating cam 22 driven by motor 22a and arranged to impart reciprocating movement to arm 23 which is connected to an actuating rod 24 associated with the snap action mechanism of contact 19. The opposite end of arm 23 is supported and positioned by a face cam 25 secured to shaft 6 for rotation therewith. Arm 23 is biased against cam 22 and cam 25 by means of spring 25a, for example. Thus rotation of control knob 5 positions the end of arm 23 with respect to its reciprocating end supported on cam 22, and thus the percentage of time contact 21 is in engagement with contact 15 as compared with the percentage of time it is in engagement with contact 16 may be varied. Cam 22 is of course driven at a relatively slow rate of speed by motor 23, for example between 1 and 3 revolutions per minute. It will be understood that the control system preferably includes a line switch 26 located in power supply line L1, and preferably actuated by control knob 5 by suitable means (not shown) so that switch 26 is closed when control knob 5 is rotated from its off position to a heating position.

In describing the operation of the control system illustrated in Fig. 1 it will be assumed that the parts are in their "cold" position as illustrated, and that a utensil has been placed on heating unit 1 so as to be in contact with temperature sensing bulb 2. As knob 5 is rotated to the desired heating position, line switch 26 is closed and thus infinite switch heat motor 23 is immediately energized through a circuit which may be traced from line L1 through switch 26, contacts 13 and 20, contacts 15 and 21, register 17, contacts 7 and 8, motor 23, and line L2. However, power is not applied to heating unit 1 until cam 22 has been rotated to a position such that movable contact member 19 has shifted to its lower position, at which time the power circuit may be traced from line L1 through switch 26, contacts 14 and 20, contacts 16 and 21, heating unit 1 and through line L2. Thus the heating cycle is begun, and heating unit 1 is continuously energized during the initial heating period because movement of contact member 19 to its lower position interrupts the power supply to motor 23 so that the infinite heat control mechanism 12 remains continuously in its "on" position. As the temperature of the utensil resting on heating unit 1 increases, bellows 3 expands, and finally movable arm 4 progresses to its mid position in which intermediate contact 7 engages both of the fixed contacts 8 and 9, whereupon a circuit through motor 23 is reestablished through contacts 7 and 9, resistor 18, contacts 16 and 21, contacts 14 and 20, and line switch 26. Hence cam 22 again begins to rotate, and infinite heat switch control mechanism 12 functions in its normal manner to periodically interrupt the supply of current to heating unit 1. It will be noted that during this period, motor 23 runs continuously inasmuch as it is energized regardless of the position of the infinite heat switch control, either through a circuit including resistor 17 or a circuit including a resistor 18. Resistors 17 and 18 function to prevent the completion of a circuit through heating unit 1 and contacts 13 and 15 of the infinite heat control mechanism when contact 7 is in engagement with contacts 8 and 9 simultaneously, their resistances being such, in relation to the resistance of heating unit 1 and the impedance of motor 23, that only a negligible current flow through heating unit 1 occurs under these conditions. The thermostatic mechanism including contacts 7, 8 and 9 is constructed so that these contacts remain in engagement with each other so long as the temperature of the utensil being heated remains within the preselected temperature range; for example, a range of forty degrees F. has been found to be desirable in an all-purpose cooking control system.

If the temperature of the utensil should increase above the upper limit of the range selected by the positioning of the control knob 5, contacts 7 and 8 separate and thus interrupt one of the alternative infinite heat control motor circuits (through resistor 17, contacts 15 and 21, and contacts 13 and 20), and thus motor 23 will continue to run only until the circuit including resistor 18, contacts 16 and 21, and contacts 14 and 20 are interrupted. Thus the main heating circuit through these latter contacts will be interrupted and remain interrupted so long as the over-temperature condition persits. Similarly, if the temperature of the utensil drops rapidly (for example, when a quantity of frozen vegetables are added to water boiling in the utensil) bellows 3 contracts sufficiently to separate contacts 7 and 9 and thus the circuit through motor 22a is interupted upon movement of intermediate contact 19 into engagement with contacts 14 and 16 rather than contacts 13 and 15. It will be evident that under these conditions the circuit elements will be arranged as in the initial condition described above so that heating element 1 is energized continuously until the temperature of the utensil returns to the pre-selected range, at which time contacts 7 and 9 will again close (contact 8 remaining in engagement with contact 7, of course) whereupon motor 22a will be re-energized and the cycling action of arm 23 will resume.

Figure 2:
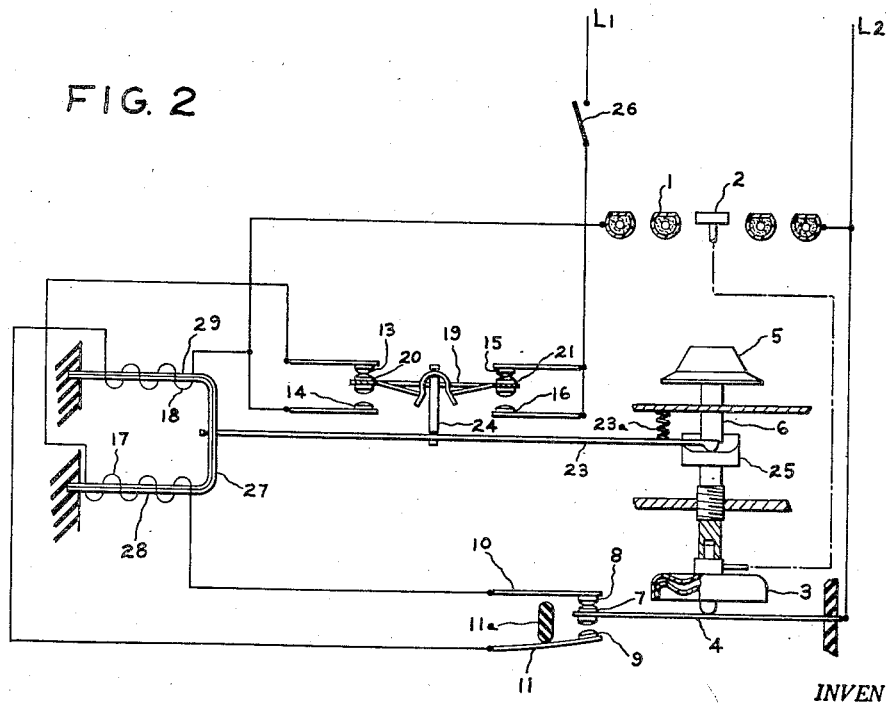
Fig. 2 is a diagrammatic view of a modified form of the invention.

Referring to Fig. 2 of the drawing which shows a modified form of the present invention, the form illustrated herein is similar to that shown in Fig. 1 but utilizes a bimetal infinite heat switch motor in place of motor 23 and cam 22 of Fig. 1. Many of the components of the system shown in Fig. 2 are identical to those shown in Fig. 1 and therefore the same numerals are used to identify identical components in both figures. However, in the embodiments shown in Fig. 2 resistors 17 and 18 are utilized to supply heat to opposite legs of a U-shaped bimetal element 27 secured to one end of arm 23, the other end being biased against arm 23 by a spring 23a. In operation, when line switch 26 is closed and the desired temperature is set by rotation of control knob 5 to a heating position, current is supplied to resistor 17 through contacts 7 and 8 and contacts 13 and 15 which are bridged by intermediate contact number 19, and thus the lower leg 28 of bimetallic element 27 is heated. As leg 28 of bimetal 27 is heated arm 23 is shifted upwardly so as to snap bridging member 19 to its lower position in engagement with contacts 14 and 16, whereupon power is supplied to heating unit 1. Inasmuch as contacts 7 and 8 remain open until the utensil in contact with bulb 2 reaches the desired temperature, the heating circuit through resistor 18 remains open and hence continuous power is supplied to heating unit 1. As the desired temperature range is reached, contacts 7 and 9 engage (contacts 7 and 8 continuing in engagement also) and thereafter resistor 18 is heated and causes leg 29 of bimetal 27 to deflect downwardly so as to actuate intermediate contact member 19 to its upper position. Thereafter, resistors 17 and 18 are alternatively heated and heating unit 1 is alternately energized and de-energized at intervals in accordance with the setting of control knob 5. Thus it will be evident that the manner of operation of the control system illustrated in Fig. 2 is substantially similar to the operation of the control system illustrated in Fig. 1.

While I have shown and described two specific embodiments of my invention, I do not desire my invention to be limited to the particular constructions shown and described, and I intend by the appended claims to cover all modifications within the true spirit and scope of my invention.

What I claim is:

1. A thermostatic control system for an electric surface heating unit comprising means responsive to the temperature of a utensil resting on said heating unit, a movable electric contact actuated by said temperature responsive means, first and second spaced resiliently mounted contacts located on opposite sides of said movable contact, said resiliently mounted contacts being biased toward each other and simultaneously engageable with said movable contact whenever said movable contact is in a range of positions corresponding to the temperature range preselected by adjustment of said temperature setting means, control means for regulating the energization of said heating unit including first and second spaced fixed contacts respectively connected to said first and second resiliently mounted contacts, a movable intermediate contact cooperating with said fixed contacts so as to be in engagement with said first or second fixed contact, said intermediate contact being in circuit with a source of electrical power in each of its two positions, and electrically energizable cycling means for periodically actuating said intermediate contact, said cycling means being connected in said system so as to be energized upon completion of a circuit through said first resiliently mounted contact and said first fixed contact and also upon completion of a circuit through said second resiliently mounted contact and said second fixed contact, and said heating unit being connected in circuit with said second fixed contact so as to be energized upon engagement of said intermediate contact therewith.

2. A thermostatic control system in accordance with claim 1 in which said cycling means comprises a movable arm connected to said intermediate contact, means for reciprocating said arm so as to actuate said intermediate contact, and manually adjustable means for shifting the range of movement of said arm.

3. A thermostatic control system in accordance with claim 2 in which said reciprocating means is a motor driven cam.

4. A thermostatic control system in accordance with claim 2 in which said reciprocating means is an electrically heated bimetallic actuator.

5. A thermostatic control system for an electric surface heating unit comprising means responsive to the temperature of a utensil resting on said heating unit, a movable electric contact actuated by said temperature responsive means, manually adjustable temperature setting means associated with said temperature responsive means and said movable contact, first and second spaced resiliently mounted contacts located on opposite sides of said movable contact, said resiliently mounted contacts being biased toward each other and simultaneously engageable with said movable contact when said movable contact is in a range of positions corresponding to the temperature range preselected by adjustment of said temperature setting means, control means for regulating the energization of said heating unit including first and second spaced fixed contacts respectively connected to said first and second resiliently mounted contacts, a movable intermediate contact cooperating with said fixed contacts so as to be in engagement with said first or second fixed contact, said intermediate contact being in a circuit with a source of electrical power in each of its two positions, electrically energizeable cycling means for periodically actuating said intermediate contact, manually adjustable means for regulating the periodic actuation of said intermediate contact, said cycling means being connected in said system so as to be energized upon completion of a circuit through said first resiliently mounted contact and said first fixed contact and also upon completion of a circuit through said second resiliently mounted contact and said second fixed contact, and said heating unit being connected in circuit with said second fixed contact so as to be energized upon engagement of said intermediate contact therewith.

References Cited in the file of this patent
UNITED STATES PATENTS

| | | |
|---|---|---|
| 2,410,014 | Clark | Oct. 29, 1946 |
| 2,498,127 | Kuhn | Feb. 21, 1950 |
| 2,767,293 | Jordan et al. | Oct. 16, 1956 |
| 2,790,057 | Schauer | Apr. 23, 1957 |
| 2,806,119 | Williams | Sept. 10, 1957 |